(12) United States Patent
Geiszler et al.

(10) Patent No.: US 6,411,199 B1
(45) Date of Patent: Jun. 25, 2002

(54) RADIO FREQUENCY IDENTIFICATION SYSTEM

(75) Inventors: Kenneth Geiszler, Campbell; Russel E. Walker, San Jose; Kenneth Alan Whiston, Santa Cruz; Jon Kwong, San Jose; Dale Lindseth, Hollister, all of CA (US)

(73) Assignee: Keri Systems, Inc., San Jose, CA (US)

( * ) Notice: Subject to any disclaimer, the term of this patent is extended or adjusted under 35 U.S.C. 154(b) by 0 days.

(21) Appl. No.: 09/138,589

(22) Filed: Aug. 21, 1998

(51) Int. Cl.[7] .................................................. H04Q 5/22
(52) U.S. Cl. ............. 340/10.1; 340/825.7; 340/825.71; 340/825.72; 375/323; 375/147; 375/260; 375/349; 342/51; 342/98; 342/102; 455/205; 455/207; 455/303; 455/304
(58) Field of Search ................... 340/825.54, 825.7, 340/825.71, 825.72, 10.1; 375/329, 334, 323, 147, 260, 349; 329/300, 304; 342/51, 98, 102; 455/205, 207, 303, 304

(56) References Cited

U.S. PATENT DOCUMENTS

| | | | |
|---|---|---|---|
| 4,353,064 A | 10/1982 | Stamm | 340/825.31 |
| 4,364,043 A | 12/1982 | Cole et al. | 340/825.54 |
| 4,546,241 A | 10/1985 | Walton | 235/380 |
| 4,650,981 A | 3/1987 | Foletta | 235/449 |
| 4,730,188 A | 3/1988 | Milheiser | 340/825 |
| 4,818,855 A | 4/1989 | Mongeon et al. | 235/440 |
| 4,963,887 A | 10/1990 | Kawashima et al. | 342/44 |
| 5,028,918 A | 7/1991 | Giles et al. | 340/825.54 |
| 5,041,826 A | 8/1991 | Milheiser | 340/825.54 |
| 5,166,676 A | 11/1992 | Milheiser | 340/825.54 |
| 5,175,418 A | 12/1992 | Tanaka | 235/439 |
| 5,382,952 A | 1/1995 | Miller | 340/825.54 |
| 5,466,246 A | * 11/1995 | Silvian | 607/32 |
| 5,491,471 A | 2/1996 | Stobbe | 340/825.34 |
| 5,521,602 A | 5/1996 | Carroll et al. | 342/50 |
| 5,600,683 A | 2/1997 | Bierach et al. | 375/363 |
| 5,907,585 A | * 5/1999 | Suzuki et al. | 375/324 |
| 5,952,935 A | * 9/1999 | Mejia et al. | 340/825.54 |

FOREIGN PATENT DOCUMENTS

| | | | |
|---|---|---|---|
| EP | 0 569 131 A2 | 6/1993 | G06K/19/07 |
| EP | 0 758 777 A2 | 2/1997 | G07F/7/10 |
| WO | WO 98/52168 | 11/1998 | |

OTHER PUBLICATIONS

Taub and Schilling, Principles of Communication Systems, McGraw–Hill, pp295–298, Dec. 1971.*
"Aircraft Internal Time Division–Command/Response Multiplex Data Bus", Sep. 21, 1978, Department of Defense, Mil–Std–1553B, pp. i–34.
"CMOS Manchester Encoder–Detector", Mar. 1997, Harris Semiconductor, HD–15530, File No. 2960.1, pp. 5.140–5.152.
"Contactless Programmer Interface Protocol", 1997, Microship Technology, Inc., TB019, DS91019A, pp. 1–3.
"Contactless Programmable Passive RFID Device with Anti–Collision", Jul. 1997, Microchip Technology, Inc., MCRF250/350.

* cited by examiner

*Primary Examiner*—Michael Horabik
*Assistant Examiner*—M Shimizu
(74) *Attorney, Agent, or Firm*—Thelen Reid & Priest LLP; David B. Ritchie (57) ABSTRACT

A radio frequency identification system includes a transponder and a transponder reader. The transponder, responsive to an interrogation signal continuously transmitted by the transponder reader, generates a transponder signal modulated by an identification signal readable by the transponder reader. The identification signal includes a synchronization portion, a data portion, an output format identification portion, and an error detection portion. The output format identification portion is used by the reader to configure itself for communication with an attached controller. In another aspect of the invention, the transponder reader may be configured to read FSK as well as PSK encoded signals from the transponder.

6 Claims, 6 Drawing Sheets

RADIO FREQUENCY IDENTIFICATION SYSTEM

BACKGROUND OF THE INVENTION

1. Field of the Invention

This invention is directed generally to the field of Radio Frequency (RF) identification systems employing an electronic transponder and a transponder reader which emits an RF interrogation signal at a first frequency which powers the electronic transponder and enables it to transmit a response on a second frequency (usually a lower frequency). Such systems are used in a number of fields including access security, object identification, inventory control, and generally any field where a small transponder unit may be associated with an object and remotely probed and read by a radio frequency transmission emitted by a transponder reader.

2. The Background Art

Radio frequency identification systems are well known in the art. Such systems are commonly in use in building access schemes where an authorized user of the building is given a building access card containing an authorization code number stored and optionally encrypted on the card as a binary string of data. The card is then presented to a transponder reader which continuously transmits an RF interrogation signal. The card containing a transponder receives the continuously transmitted signal from the transponder reader, uses it to power circuitry on board the card, modulate an RF carrier signal having a different frequency (usually lower) from that of the RF interrogation signal received from the reader (typically an integer fraction of the RF interrogation signal frequency, e.g., 1/2, 1/3, 1/4, etc.) with an identification signal stored on the transponder and containing an authorization code number, and the transponder reader then reads the identification signal emitted from the transponder and passes the authorization code number to an appropriate controller for determining whether or not the authorization code number received is sufficient to allow the user access to the building. If the authorization code number is sufficient, generally a lock will be opened enabling a door to be opened and optionally a computer will log the entry for future reference.

Other implementations of such systems enable object identification by reading a transponder attached to or embedded in the object (e.g., cargo identification, pet identification, taxi identification at an airport, and the like).

Generally, all existing transponder readers of such radio frequency identification systems utilize proprietary systems. That is, a card from one system will not be readable by a system provided by another vendor. In some systems, the transponder emits a signal modulated by frequency shift keying (FSK), i.e., the binary transmission is represented by a mark and a space which correspond to the 1 and 0 of the binary signal, the mark and space being signals on two separate frequencies (e.g., 1/8 and 1/10 of the frequency of the RF interrogation signal). Other systems utilize phase shift keying (PSK) as well known in the art. Systems using PSK modulation cannot read the cards which transmit FSK modulated information and systems which read FSK modulated information cannot read the cards which transmit PSK modulated information.

While all such transponder readers read matching transponder cards, in most systems they are also required to communicate with a controller of some sort. The controller generally comprises a central processing unit (CPU) which may interact with a number of such readers which are simultaneously connected to it. A number of different systems have evolved over the years for communicating data from a reader to a controller. Some of these systems, or communications protocols, are known as magnetic stripe communications protocol, Wiegand communications protocol, single wire Wiegand communications protocol, RS232 communications protocol, RS422 communications protocol, and the like. These various communication protocols generally require 1, 2, 3 or more electrical wire connections between the transponder reader and the controller. Furthermore, the data modulation schemes for these various systems differ as well known to those of ordinary skill in the art. This has led to a problem in the industry in the stocking of transponder readers. In order to stock transponder readers which are compatible with the various communications protocols employed by the various controllers, one needs to stock many transponder readers which are mutually incompatible with one another. A need, therefore, exists for a transponder reader which is capable of working with a number of different communication protocols in communicating with a corresponding controller so as to reduce the inventory requirements for transponder readers.

It is also desirable to have the transponder reader require as little field programming as possible. In this way, relatively unskilled personnel may successfully install transponder readers and have them operate with corresponding controllers and transponders with relatively little difficulty. To avoid the necessity to physically program such readers to communicate using a given communications protocol (as by setting DIP switches or jumpers) would be highly desirable.

OBJECTS AND ADVANTAGES OF THE INVENTION

Accordingly, it is an object and advantage of the present invention to provide an improved RF identification system.

It is a further object and advantage of the present invention to provide an improved transponder reader for use in RF identification systems.

It is a further an object and advantage of the present invention to provide a capability to program the transponder reader to communicate with an attached controller using a communications protocol specified by information contained in an output format identification portion of the identification signal stored in the transponder and transmitted to the transponder reader.

It is a further object and advantage of the present invention to provide an improved transponder for use in an RF identification system.

It is a further object and advantage of the present invention to provide a transponder for use in an RF identification system which contains an identification signal which has within it, in addition to an authorization code number, an output format identification portion which, when transmitted to and received by the transponder reader, defines the communications protocol to be used by the transponder reader in communicating with attached devices such as a controller.

Yet another object and advantage of the present invention is the provision of a transponder reader capable of reading both PSK and FSK signals.

Yet another object and advantage of the present invention is the provision of a mechanism by which either the PSK or the FSK mode of operation may be normally disabled and easily authorized in an accountable manner.

These and many other objects and advantages of the present invention will become apparent to those of ordinary skill in the art from a consideration of the drawings and ensuing description of the invention.

SUMMARY OF THE INVENTION

A radio frequency identification system includes a transponder and a transponder reader. The transponder, responsive to an interrogation signal continuously transmitted by the transponder reader, generates a transponder signal modulated by an identification signal readable by the transponder reader. The identification signal includes a synchronization portion, a data portion, an output format identification portion, and an error detection portion. The output format identification portion is used by the reader to configure itself for communication with an attached controller. In another aspect of the invention, the transponder reader may be configured to read FSK as well as PSK encoded signals from the transponder.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
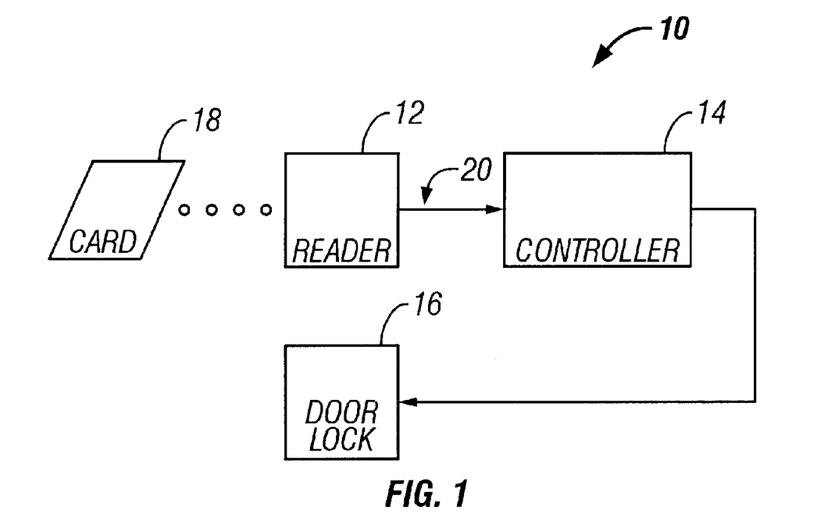
FIG. 1 is a system block diagram of an RF identification system in accordance with a presently preferred embodiment of the present invention.

The present invention is directed to a radio frequency (RF) identification system which solves many problems of the prior art. Turning now to FIG. 1, a system diagram of a radio frequency identification system generally denoted 10 in accordance with a presently preferred embodiment of the present invention is shown. System 10 includes a transponder reader 12, a controller 14, and something controlled by the controller such as a door lock 16, and a transponder 18. As with all such radio frequency identification systems, transponder reader 12 preferably continuously emits a radio frequency interrogation signal of a given frequency. According to presently preferred embodiments of the present invention, the interrogation signal is either at approximately 125 KHz or at approximately 13.56 MHz although those of ordinary skill in the art will realize that virtually any other frequency in the RF spectrum could be used. The radio frequency signal is received by transponder 18 which includes an antenna and a rectifier circuit or "power circuit" for deriving electrical power from the received signal. Transponder 18 then transmits, in response to receipt of the interrogation signal from transponder reader 12, a transponder signal of a lower frequency than the interrogation signal having modulated thereon a stored identification signal in the form of a binary data stream. As long as the transponder 18 is close enough to transponder reader 12 that it can receive the interrogation signal therefrom, it will also continuously transmit a transponder signal which can then be picked up by the transponder reader 12 and demodulated.

Upon demodulating the transponder signal, transponder reader 12 obtains therefrom the identification signal originally stored on card 18. A portion of the identification signal is an authorization code number. That authorization code number is passed from transponder reader 12 to controller 14 over data communication line 20 in accordance with a given data communications protocol. In accordance with a presently preferred embodiment of the present invention, the data communications protocol used over line 20 is specified by an output format identification portion of the identification signal transmitted from transponder 18 to transponder reader 12. The protocol may be preferably one of several well known in the art such as, for example, RS232, RS422, various versions of the Wiegand protocol, and various versions of the mag stripe protocol. Other protocols may also be specified and used where appropriate.

The ability to store the selected data communications protocol to be used by a transponder reader 12 reading the transponder at the time of initially programming the transponder 18 permits a single transponder reader 12 to be used with a variety of controllers 14 and avoids the necessity for stocking a number of different transponder readers each compatible with a particular controller system.

Upon receipt of a valid authorization code number over line 20, controller 14 then activates door lock 16 or other appropriate apparatus as well known to those of ordinary skill in the art.

Figure 2:
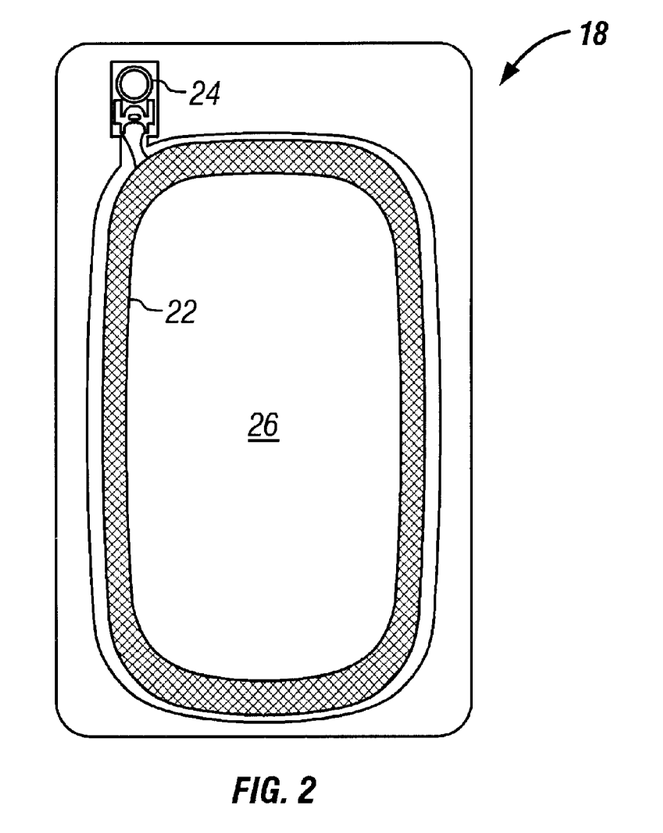
FIG. 2 is a sectional top plan view of a transponder card in accordance with a presently preferred embodiment of the present invention.

Turning now to FIG. 2, a top view of a typical transponder 18 is shown. Transponder 18 comprises an antenna 22 connected to a transponder integrated circuit 24 all preferably embedded within a plastic card or tag 26 or otherwise encapsulated. According to a presently preferred embodiment of the present invention, the integrated circuit is a Micro Chip Technology MCRF250 or MCRF350. The MCRF250 operates at 125 KHz and the MCRF350 operates at 13.56 MHz. Those of ordinary skill in the art will realize that this particular integrated circuit can be substituted for individual components or other integrated circuits made by other manufacturers in order to achieve the same purpose and function. Micro Chip Technology, Inc. is located in Chandler, Ariz.

Figure 3:
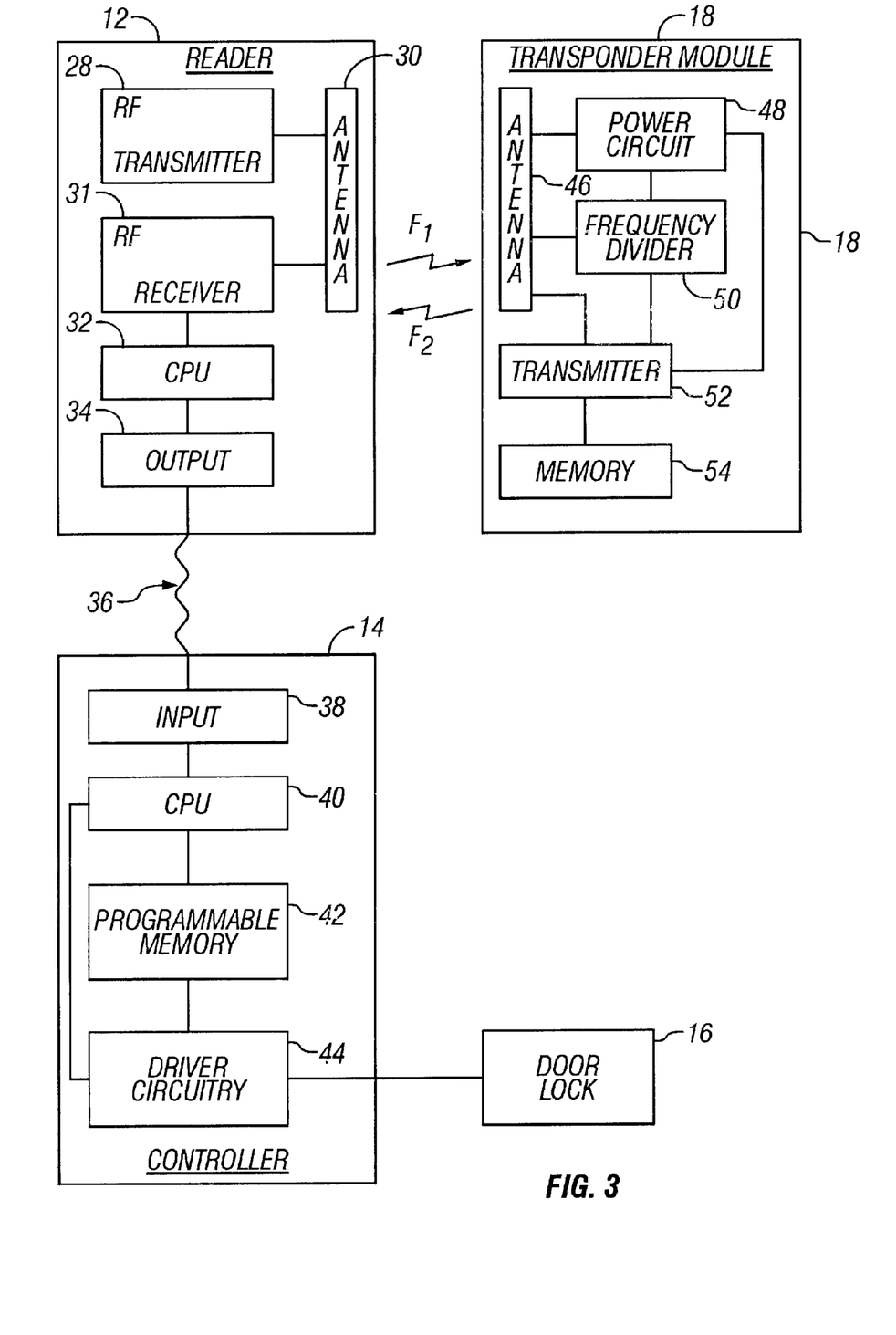
FIG. 3 is a detailed system block diagram of an RF identification system in accordance with a presently preferred embodiment of the present invention.

Turning now to FIG. 3, a detailed block diagram of a system in accordance with the present invention is shown. Reader or transponder reader 12 includes an RF transmitter section 28 which generates an RF carrier signal which is coupled to antenna 30 for transmission from reader transponder 12. Also coupled to antenna 30 is an RF receiver section for receiving and demodulating signals received from the transponder 18 over antenna 30. Coupled to the RF receiver section 31 is a CPU 32 which processes and demodulates the identification signal received from the transponder 18 and sets the communications protocol to be used in communicating between transponder reader 12 and controller 14 in accordance with an output format identification portion of the identification signal received from the transponder module 18. CPU 32 is coupled to conventional output drivers 34 and a data link 36 communicating with controller 14.

Controller 14 includes typical input circuitry 38 coupled to a conventional CPU 40 which is in turn coupled to programmable memory 42 for storing access criteria to be compared with the authorization code number received from the transponder reader 12. CPU 40 is also coupled to driver circuitry 44 of a conventional nature for driving a door lock or other associated apparatus 16 upon determination by CPU 40 that access is permitted. Those of ordinary skill in the art will also realize that this system can easily be adapted to systems for inventory control and object identification and tracking, e.g., by recording the presence of a serial number received from a transponder module rather than by opening a door lock.

Transponder 18 comprises an antenna 46 coupled to a power circuit 48 which rectifies a received interrogation signal from transponder reader 12 to power the circuitry of transponder 18. Also coupled to antenna 46 is a frequency divider circuit 50 for providing a carrier signal to transmitter 52 (also coupled to antenna 46). Frequency divider 50 provides a signal used by transmitter 52 to modulate an identification signal onto. The identification signal is preferably stored as a binary 128 bit value in memory 54. Those of ordinary skill in the art will realize that other numbers of bits could be used as could non-binary values. Memory 54 is preferably a one time programmable memory cell, such as an EPROM (Electrically Erasable Programmable Read Only Memory). Upon activation by the presence of an interrogation signal, transmitter 52 transmits an identification signal modulated onto a carrier at an integer fraction of the interrogation signal. For a 125 KHz system (i.e., one operating with an interrogation signal of 125 KHz), the transponder signal in PSK mode is at approximately 62.5 KHz and in FSK mode is at 12.5 KHz and 15.625 KHz for the mark and space (the one that is the mark and the one that is the space are a matter of choice for the developer).

Figure 4:
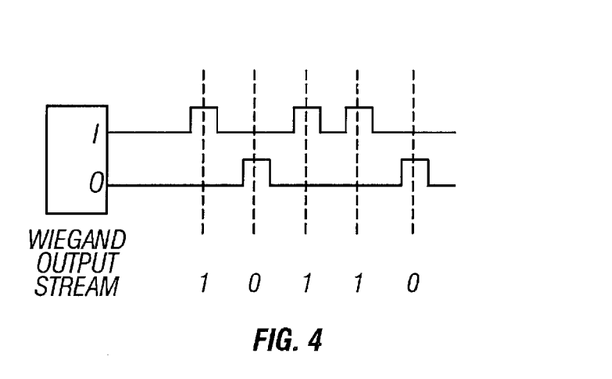
FIG. 4 is a timing and data output diagram for a conventional Wiegand output data stream.

Turning now to FIG. 4, the output of a Wiegand output stream is depicted. In the Wiegand output protocol there are two active lines, one associated with the binary value 1 and the other associated with the binary value 0. To indicate the presence of a 1, the 1 line goes high and the 0 line stays low. To indicate the value of 0, the 0 line goes high and the 1 line stays low. FIG. 4 indicates the manner in which the binary value 10110 would be transmitted over this pair of lines.

Figure 5:
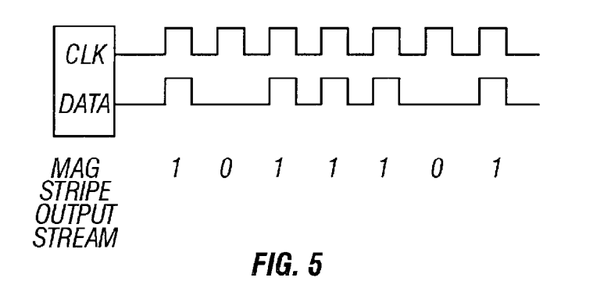
FIG. 5 is a timing and data output diagram for a conventional mag stripe output data stream.

FIG. 5 shows data transmission in accordance with the conventional mag stripe output protocol. In the mag stripe protocol, there are two lines for conveying data, one is a clock line (CLK) and one is a data line (DATA). The clock line generates a pulse at a regular time interval. The data line generates a pulse corresponding with a clock pulse to represent a 1 and the lack of a pulse corresponding with a clock pulse indicates a 0. The signals shown in FIG. 5 indicate how the binary value 1011101 would be transmitted over this pair of lines in a conventional mag stripe output protocol.

Those of ordinary skill in the art will realize that there are a number of different ways to transmit such data including RS422, RS232, various versions of the mag stripe output stream format including open collector versions thereof and various versions of the Wiegand output stream format including open collector versions thereof and single wire versions thereof. The advantage of this aspect of the present invention is that the transponder reader 12 can be simply programmed by the transponder to output data to the controller 14 in any one of a number of different data communications protocols by simply setting the output format identification portion of the identification signal stored on the transponder 18 to the correct value corresponding to that particular communications protocol.

In practice, an installer would purchase a transponder reader 12 in accordance with the present invention and connect it to an existing controller 14 having a given data communications protocol. The transponders 18 would then all be programmed in accordance with the controller's requirements. A data communications protocol would be specified in the output format identification portion of the identification signal stored on the transponder 18 (this value is not passed to the controller 14). Where the card is read, the reader automatically passes only the authorization code number to the controller 14 in accordance with the specified protocol.

Figure 6:
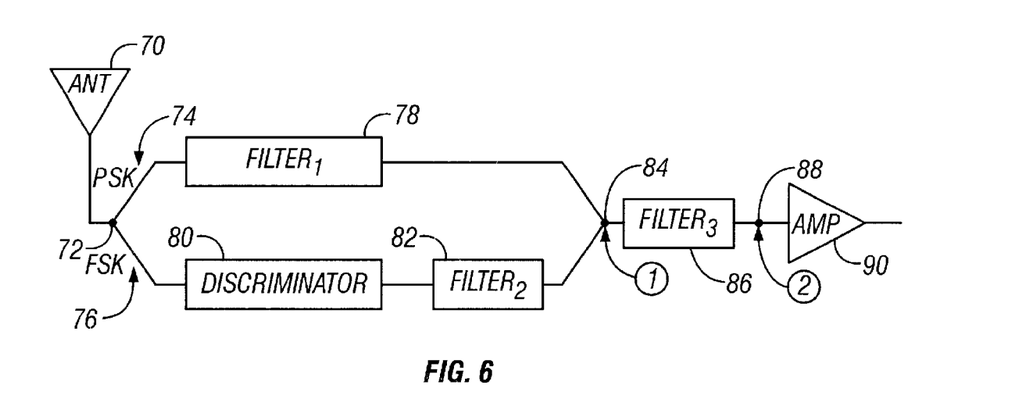
FIG. 6 is a block diagram of a circuit for receiving transponder signals modulated with either PSK or FSK modulation techniques in accordance with a presently preferred embodiment of the present invention.

Turning now to FIG. 6, an additional aspect of the invention is disclosed. Because most transponders used in RF identification systems use either phase shift keying (PSK) or frequency shift keying (FSK), it has usually been the case that transponders and transponder readers had to comport with one standard or the other standard, i.e., PSK or FSK. No prior known systems are capable of dual mode operation. In accordance with the present invention, however, the front end of the reader comprises two distinct signal processing paths. The first path processes PSK signals and the second path processes FSK signals. Generally, PSK signals are at a carrier frequency of one-half (or another integer fraction) of the interrogation signal frequency. That means, for an interrogation signal frequency of 125 KHz, the transponder's response PSK signal would be at 62.5 KHz. FSK signals, on the other hand, commonly have a mark signal and a space signal, one of the mark and space signals being at one-eighth the interrogation signal frequency and the other being at one-tenth the interrogation signal frequency. Other frequency shifts may be used. Thus, an FSK signal might have a mark at 12.5 KHz, and a space at 15.625 KHz, or vice versa. It is therefore possible, with filters, to direct the two signal trains through different branches of a circuit for processing.

Turning now to FIG. 6, an antenna 70 associated with the transponder reader 12 receives a signal from transponder 18 and passes it to circuit node 72. At circuit node 72, the signal will pass along branch 74 if it is a PSK signal, i.e., it has a first frequency less than the frequency of the interrogation signal. Similarly, the signal will pass along branch 76 for FSK processing if it has a frequency less than that of a PSK signal. In this example, assuming that the interrogation signal is a 125 KHz signal, 62.5 KHz signals will pass along the PSK branch 74 and 12–15 KHz signals will pass along the FSK branch 76. This is made possible by the use of filters. Filter No. 1 (78) is designed to pass frequencies consistent with the PSK signal pass band. In this example, those frequencies would be near 62.5 KHz. Filter 78 is designed to reject frequencies at 125 KHz as well as to reject frequencies significantly below 62.5 KHz, such as a FSK signals at 12–16 KHz. Turning to the FSK processing branch 76, discriminator 80 is used in a conventional manner to discriminate or AM (Amplitude Modulation) envelope detect the mark and space FSK signals at 12–16 KHz. Filter No. 2 (82) is designed to stop 125 KHz signals but to pass those signals in the range of 12–16 KHz. The PSK and FSK branches 74 and 76 rejoin at node 1 (84) and are then passed through filter no. 3 (86) which also rejects 125 KHz signals whereupon they reach node 2 (88) and are input to an operational amplifier or other amplifier circuit 90 for amplification prior to being processed in a conventional way by the remainder of the circuitry of the system.

Figure 7:
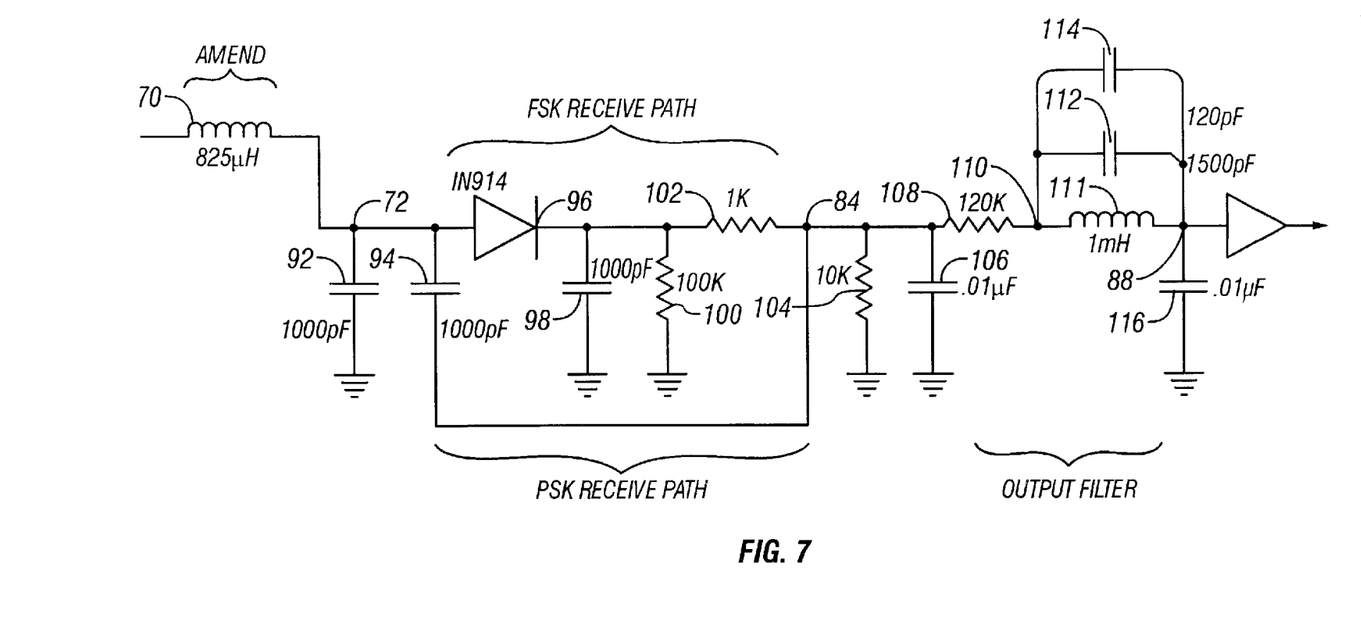
FIG. 7 is a detailed circuit diagram for circuit for receiving transponder signals modulated with either PSK or FSK modulation techniques in accordance with a presently preferred embodiment of the present invention.

The block diagram of FIG. 6 is illustrated in more detail in FIG. 7 with a detailed schematic diagram. In accordance with a presently preferred embodiment operated at 125 KHz, antenna 70 comprises an 825 $\mu$H inductor which is coupled to circuit node 72. Filter 1 (78) from FIG. 6 comprises 1000 pF capacitor 92 disposed between node 72 and ground, and 1000 pF capacitor 94 disposed between node 72 and node 84.

In the FSK receive path 76,.discriminator 80 comprises diode 96 which is preferably of the type 1N914 but may be any appropriate transistor or diode or other device capable of detecting the AM envelope of the FSK signal. Filter 2 (82) comprises 1000 pF capacitor 98 disposed between the cathode of diode 96 and ground along with resistor 100 which is preferably a 100 kilohm resistor disposed between the cathode of diode 96 and ground and resistor 102 which is preferably a 1000 ohm resistor disposed between the cathode of diode 96 and node 84, filter 3 (86) comprises resistor 104 which is preferably a 10 kilohm resistor disposed between node 84 and ground, capacitor 106 which is preferably a 0.01 $\mu$F capacitor disposed between node 84 and ground, a resistor 108 which is preferably a 120 ohm resistor disposed between node 84 and node 110, inductor 111 which is preferably a 1 mH inductor disposed between node 110 and node 88 in parallel with, capacitor 112 and capacitor 114 which are preferably, respectively, 1500 pF and 120 pF capacitors, and finally, capacitor 116 which is preferably 0.01 $\mu$F capacitor disposed between node 88 and ground.

Figure 10:
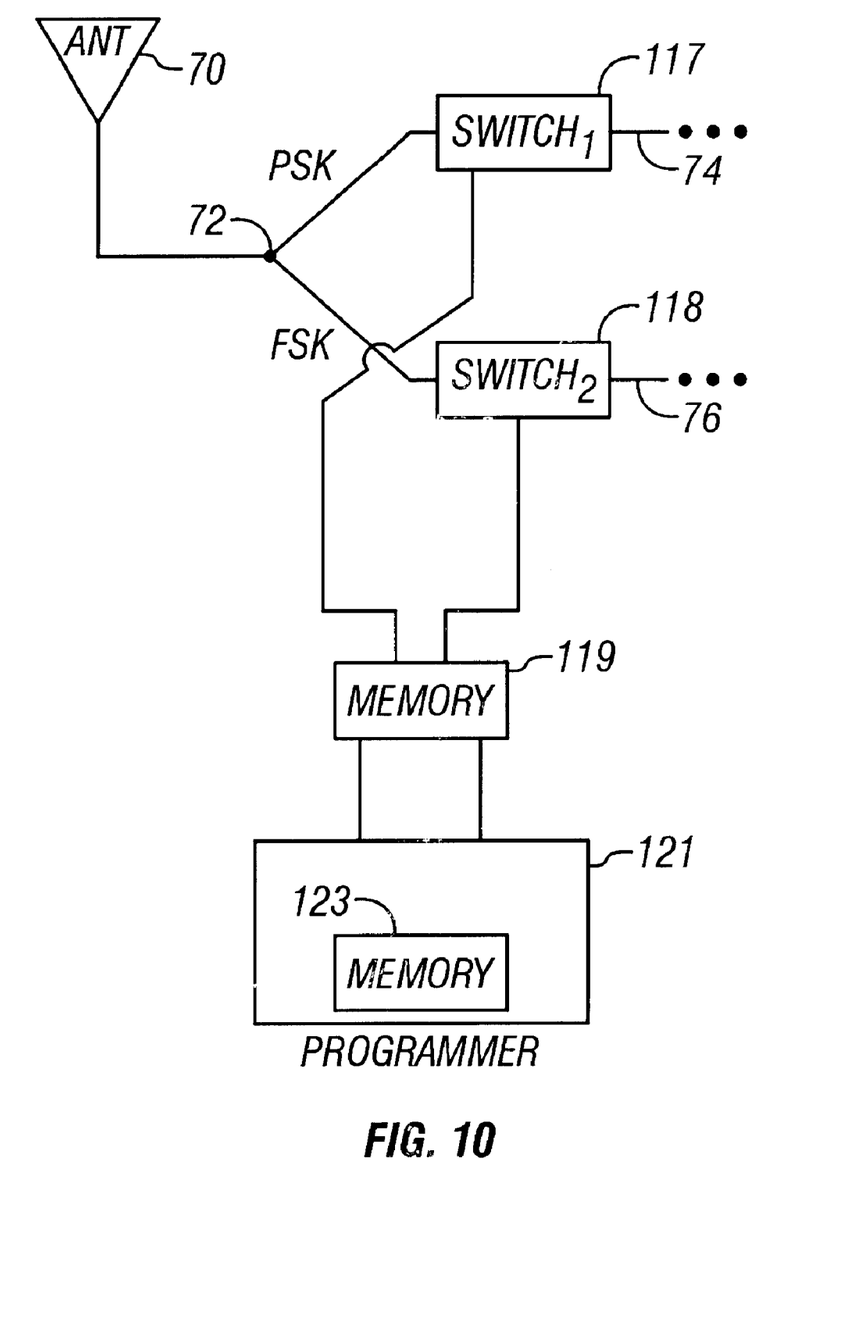
FIG. 10 a partial block diagram of a modification of the circuit of FIG. 6 in which programmable switches control the flow of RF signal through the PSK and FSK signal processing branches of the transponder reader in accordance with a presently preferred embodiment of the present invention.

In accordance with a presently preferred embodiment of the present invention shown in FIG. 10, a switch 117, 118 (such as a transistor, relay or like device) may be incorporated into either or both of PSK branch 74 and FSK branch 76. The switch 117, 1 18 may be operated by a microprocessor, memory cell 119, or other convenient means well known to those of ordinary skill in the art. The switch may be utilized to enable/disable one or both branches. In this way, for marketing purposes or for other purposes such as security purposes, one branch may be left disabled and the customer could be charged an additional fee for use of an enabler 121 to unlock the remaining signal path, or switch to the other signal path. An enabler 121 could take many forms. Presently preferred is an EEPROM based device which would temporarily mate with a connector on transponder reader 12 to enable FSK operation (for example) and simultaneously decrement a counter in a memory 123 on board the enabler. Once the enabler's counter reached zero, it could not be used again without being reset by the vendor. In this way a premium could be charged for dual mode use and the premium charge could be associated with the sale of or use of the enabler.

Figure 8:
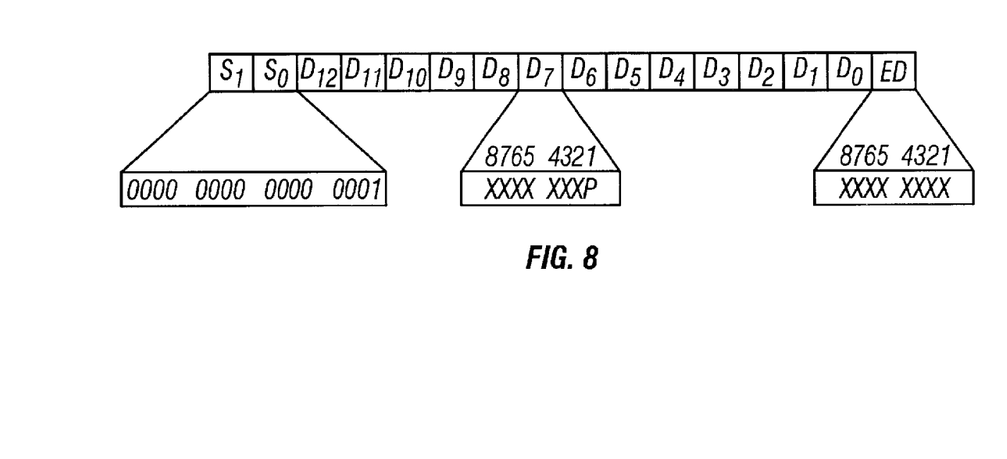
FIG. 8 is a diagram showing the layout of data stored on a transponder card in accordance with a presently preferred embodiment of the present invention.

Turning now to FIG. 8 depicted there is shown a diagram illustrating the organization of the identification signal stored on transponder 18 as a binary value and transmitted in response to receipt of an interrogation signal by the transponder reader 12. As can be seen, the identification signal is broken into 16 eight bit groups or bytes for a total of 128 bits. Those of ordinary skill in the art will realize that other configurations could be used and that this description applies only to a presently preferred embodiment of the present invention. In accordance with the presently preferred embodiment of the present invention, the bytes are denoted from left to right as follows: S1, S0, D12, D11, D10, D9, D8, D7, D6, D5, D4, D3, D2, D1, D0, a Bytes S1 and S0 represent the synchronization portion of the identification signal. These are set to the binary value 0000 0000 and 0000 0001 which corresponds to a 0 having even parity and a 0 having odd parity. The data fields D12 through D0 are each configured as seven bits of data followed by a parity bit. Those of ordinary skill in the art will realize that the parity bit could be any of the eight bits. Byte ED is an error detection byte in which is stored an eight bit CRC (Cyclic Redundancy Cheek) value calculated over bytes D0 through D12. Such CRC or cyclic redundancy check system are well known to those of ordinary skill in the art. In a presently preferred embodiment of the present invention a 64 bit authorization code number is stored in the identification signal as follows: bit 63 is stored as the first data bit (seventh bit from left) of block D9, bits 62–56 are stored as bits 1–7 of block D8, bits 55–49 are stored as bits 1–7 of block D7, bits 48–42 stored as bits 1–7 of block D6, bits 41–35 are stored as bits 1–7 of block D5, bits 34–28 is are stored as bits 1–7 of block D4, bits 27–21 are stored as bits 1–7 of block D3, bits 20–14 are stored as bits 1–7 of block D2, bits 13–7 are stored as bits 1–7 of block D1 and bits 6–0 are stored as bits 1–7 of block D0. Additional bits in blocks D12, D11, D10 and D9 may be used for various functions including the provision of an output format identification portion of the signal.

In order to provide a variable bit length output from the transponder reader 12 to the controller 14, a single start bit is encoded in the access I.D. (Identification) portion of the data field (i.e.) D9:1 through D0:1. The start bit immediately follows any necessary leading zeroes and immediately precedes the most significant bit of the authorization code number. It therefore indicates by its position in the field, the number of output bits required.

An example of how the authorization code number is stored in the identification signal follows. Assume that one desires to store authorization code number 8481041 (decimal). This is 816911 in hexadecimal and 1000 0001 0110 1001 0001 0001 in binary. A total of 24 bits are required to store this value. This number must be encoded, however, as a 26-bit number when the two parity bits are appended. Thus the number to encode becomes 01 0000 0010 1101 0010 0010 0011 using the published Security Industry Association 26-Bit Wiegand Reader Interface Standard. Then 26 bits will now occupy bit portions 0 through 25 of the data portion of the identification signal. A Start Bit will be placed at bit position 26 (indicating 26-bit format). The bit pattern (not including data byte parity bits) is thus: 1010 0000 0101 1010 0100 0100 011 with the addition of the Start Bit. Distributing these bits into the 7-data bit/1-parity bit per byte format results in the following:

| | |
|---|---|
| D5: | 0000 0001 |
| D4: | 0000 0001 |

-continued

| | |
|---|---|
| D3: | 0101 0001 |
| D2: | 0001 0110 |
| D1: | 0100 1001 |
| D0: | 0100 0110 |

Figure 9:
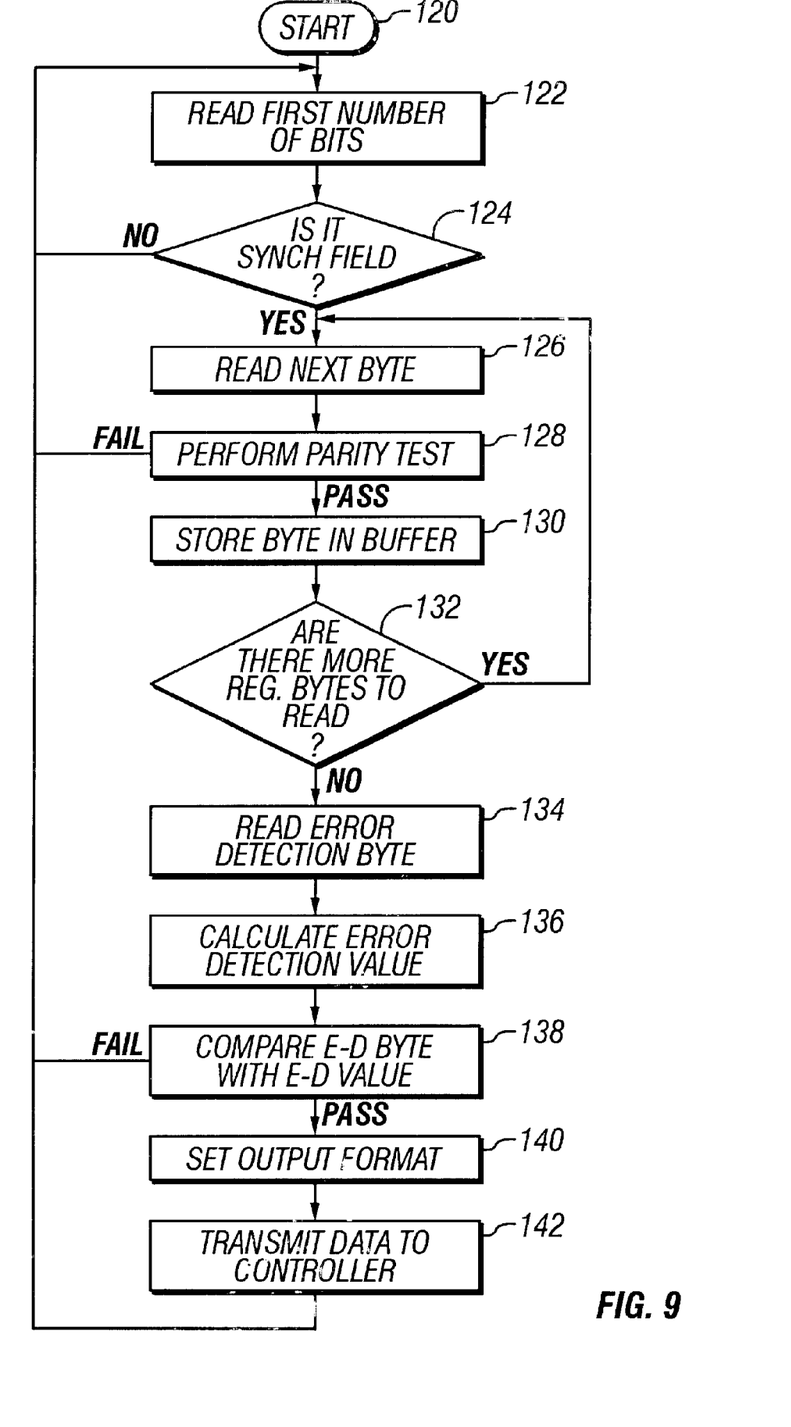
FIG. 9 is a flow chart diagraming a method for reading and verifying data received from a transponder card in accordance with a presently preferred embodiment of the present invention.

A method of reading the identification signal and simultaneously verifying its validity is depicted in FIG. 9. In accordance with the method of FIG. 9, the process starts at block 120. At block 122 the first number of bits is read. In accordance with the presently preferred embodiment of the present invention, this would include a 16 bit group of bits corresponding to the length of the synchronization field S0, S1. The bit pattern obtained in block 122 is then compared with the pre-determined synchronization field to determine if, in fact, it is the synchronization field at block 124. The synchronization bit pattern S1, S1 defined above is selected because it cannot be duplicated in any of the valid data fields or in the error detection field. This is so because of the parity requirement for the data fields D0 through D12. If the bit pattern obtained in block 122 is not the synchronization field, control is transferred back to block 122 where the next bit pattern shifted over one bit from the identification signal is read again. If the synchronization field is detected, control transfers to block 126. At block 126 the next eight bit byte of data is read. At block 128 a parity test is conducted because that byte must be one of the data bytes. If the parity test has failed, control transfers back to block 122. If the parity test is passed, control transfers to block 130 whereupon the byte is a valid byte and is stored in a buffer for later use. At block 132, if additional bytes in the data field remain to be read, control is transferred back to block 126 in order to read those additional bytes. If no additional data bytes remain to be read, then control transfers to block 134 where the error detection byte, the final byte in the identification signal, is read. At block 136, the error detection value is calculated for the bytes that have been stored. This value is then compared at block 138 with the error detection value that was read. If the two values are not the same, then there is an error and control transfers back to block 122 for additional processing. If no error is detected, then control passes to block 140 whereupon the output format determined from the identification signal output format identification portion is set in the transponder reader 12 for establishing an appropriate protocol for communication with the controller 14. Data is then transmitted from the transponder reader 12 to the controller 14 in block 142 and the process starts anew with control transfer back to block 122.

According to the presently preferred embodiment of the present invention, the error detection system utilizes a conventional CRC polynomial type error detection system. These systems are well known to those of ordinary skill in the art and need not be further described herein.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A transponder reader for use in a radio frequency identification system, said system including a transponder which, in response to an interrogation signal, transmits an identification signal, said transponder reader comprising:

means for producing an interrogation signal having a first RF frequency;

means for receiving a transponder carrier signal having modulated thereon the identification signal, said transponder signal produces by the transponder in response to receipt of the interrogation signal;

said means for receiving including an antenna, a PSK receive path disposed between said antenna and a first circuit node, an FSK receive path disposed between said antenna and said first circuit node, and a first filter for attenuating said first RF frequency disposed between said first circuit node and a second circuit node;

said PSK receive path including a second filter for attenuating said first RF frequency and passing frequencies approximately one-half of said first RF frequency;

said FSK receive path including a discriminator and a third filter, said third filter for attenuating frequencies approximately one-half of said first RF frequency and above and passing RF frequencies less than one-fourth of said first RF frequency.

2. A transponder reader according to claim 1 wherein said first RF frequency is 125 KHz.

3. A transponder reader according to claim 2 wherein said RF frequencies less than one-fourth of said first RF frequency are approximately 15.625 KHz and approximately 12.5 KHz.

4. A transponder reader for use in a radio frequency identification system, said system including a transponder which, in response to an interrogation signal, transmits an identification signal, said transponder reader comprising:

a emitter which produces an interrogation signal having a first RF frequency;

a detector which receives a transponder carrier signal having modulated thereon the identification signal, said transponder signal produces by the transponder in response to receipt of the interrogation signal; and a receiver which receives, wherein said receiver includes an antenna, a PSK receive path disposed between said antenna and a first circuit node, an FSK receive path disposed between said antenna and said first circuit node, and a first filter for attenuating said first RF frequency disposed between said first circuit node and a second circuit node;

wherein, said PSK receive path includes a second filter for attenuating said first RF frequency and passing frequencies approximately one-half of said first RF frequency, and said FSK receive path includes a discriminator and a third filter, said third filter for attenuating frequencies approximately one-half of said first RF frequency and above and passing RF frequencies less than one-fourth of said first RF frequency.

5. A transponder reader according to claim 4 wherein said first RF frequency is 125 KHz.

6. A transponder reader according to claim 5 wherein said RF frequencies less than one-fourth of said first RF frequency are approximately 15.625 KHz and approximately 12.5 KHz.

* * * * *